United States Patent
Johansson (10) Patent No.: US 7,732,748 B2
(45) Date of Patent: Jun. 8, 2010

(54) ACTIVE PIXEL IMAGE SENSOR WITH REDUCED READOUT DELAY

(75) Inventor: Robert Johansson, Oslo (NO)

(73) Assignee: Aptina Imaging Corporation, George Town (KY)

( * ) Notice: Subject to any disclaimer, the term of this patent is extended or adjusted under 35 U.S.C. 154(b) by 423 days.

(21) Appl. No.: 11/513,534

(22) Filed: Aug. 31, 2006

(65) Prior Publication Data
US 2008/0054164 A1 Mar. 6, 2008

(51) Int. Cl.
H01J 40/14 (2006.01)
H01L 27/00 (2006.01)
H04N 3/14 (2006.01)

(52) U.S. Cl. .............................. 250/214 R; 250/208.1; 348/308

(58) Field of Classification Search .............. 250/208.1, 250/214 R, 214.1, 214 A, 214 LA; 257/290–292, 257/431, 443, 444; 348/294, 241, 302–304, 348/307, 308; 327/333, 540–543; 330/261, 330/308; 315/291, 307
See application file for complete search history.

(56) References Cited

U.S. PATENT DOCUMENTS

| | | | |
|---|---|---|---|
| 5,471,515 A | 11/1995 | Fossum et al. | |
| 5,898,168 A * | 4/1999 | Gowda et al. | 250/208.1 |
| 5,920,345 A | 7/1999 | Sauer | |
| 5,965,871 A * | 10/1999 | Zhou et al. | 250/208.1 |
| 6,037,577 A * | 3/2000 | Tanaka et al. | 250/208.1 |
| 6,844,897 B1 | 1/2005 | Andersson | |
| 6,885,396 B1 | 4/2005 | Panicacci et al. | |
| 6,917,027 B2 | 7/2005 | Krymski | |
| 7,002,628 B1 | 2/2006 | Panicacci | |
| 2001/0002045 A1 | 5/2001 | Fossum et al. | |
| 2002/0097329 A1* | 7/2002 | Yang et al. | 348/294 |
| 2003/0025816 A1* | 2/2003 | Sakuragi | 348/301 |
| 2004/0036785 A1 | 2/2004 | Takayanagi | |
| 2004/0223065 A1 | 11/2004 | Takayanagi | |
| 2005/0151869 A1 | 7/2005 | Andersson | |
| 2005/0280737 A1 | 12/2005 | Takayanagi | |
| 2006/0012697 A1 | 1/2006 | Boemler | |
| 2006/0044243 A1 | 3/2006 | Rysinski | |
| 2006/0044414 A1 | 3/2006 | Lee et al. | |
| 2006/0044437 A1 | 3/2006 | Shah | |
| 2007/0241258 A1* | 10/2007 | Altice | 250/208.1 |

OTHER PUBLICATIONS

Niewiadomski et al., CMOS Read-out IC with op-amp pixel amplifier for infrared focal plane arrays, ASIC Conference and Exhibit, 1997 Proceedings, Tenth Annual IEEE International, Sep. 1997, pp. 69-73.

(Continued)

Primary Examiner—Georgia Y Epps
Assistant Examiner—Don Williams
(74) Attorney, Agent, or Firm—David C. Kellogg (57) ABSTRACT

Methods, devices, and systems for improving (i.e., reducing) the settling time of an output signal read from a photo sensor and improving the PSRR of the supply voltage are disclosed, wherein a detected charge in a pixel is converted to a voltage and drives a source follower transistor. A bias transistor is coupled in series with the source follower transistor and includes an output therebetween. The bias transistor is driven to source a reduced current when the voltage results from a readout of a reset value of the pixel and the bias transistor is driven to source an enhanced current when the voltage results from a readout of a sensed signal value.

30 Claims, 5 Drawing Sheets

OTHER PUBLICATIONS

Vincence et al., Low-voltage class AB Operational Amplifier, Integrated Circuits and Systems Design, Sep. 2001, pp. 207-211.

PCT International Search Report and Written Opinion for Application No. PCT/US2007/077228 dated Nov. 18, 2008.

* cited by examiner

ACTIVE PIXEL IMAGE SENSOR WITH REDUCED READOUT DELAY

BACKGROUND OF THE INVENTION

1. Field of the Invention

The present invention relates to active pixel sensors. More specifically, the present invention relates to reducing readout delay in an active pixel sensor.

2. Description of Related Art

Many systems include imaging devices to sense and capture optical images that can be electronically converted to a digital representation of the image. Image sensors include an array of photo-sensitive devices such as photo diodes or photo-transistors fabricated on, for example, a complementary metal oxide semiconductor (CMOS) device. Each photo-sensitive device is sensitive to light in such a way that it can create an electrical charge that is proportional to the intensity of light striking the photo-sensitive device. The overall image captured by an image sensor includes many pixels arranged in an array such that each pixel detects the light intensity at the location of that pixel.

Imaging devices formed according to a conventional CMOS process are known as a CMOS imager and may be configured to include active pixel sensors (APS). An active pixel sensor (APS) consists of an integrated circuit containing an array of pixels, each containing a photo detector (e.g., photo diode or other similar device) as well as other transistors for resetting and gating the stored charge on the photo detectors. In a conventional CMOS imager, each pixel cell in an array of pixels operates to convert light intensity to electrical charge, accumulate the electrical charge in proportion to the light intensity, and transfer the accumulated charge to an amplifier. In many CMOS imagers, a pixel may be reset to a specific reference voltage level prior to, or after, acquiring the image.

The circuitry for retrieving or obtaining a reading of the accumulated charge corresponding to the light intensity is conventionally known as "readout circuitry." Various implementations of readout circuitry are constrained by slow signal settling or transitioning of the output signal in response to reading of the stored charge on the photo diode. Furthermore, while the photo detectors are just a portion of the actively switching circuits in a system, electrical transients from other switching circuitry may inadvertently introduced transient variations to the power supply voltage range resulting in a skewed output signal.

Therefore, there is a need for circuits, devices, methods and systems for reducing signal settling time and reducing supply line transients in an APS array.

BRIEF DESCRIPTION OF THE DRAWINGS

In the drawings, which illustrate what is currently considered to be the best mode for carrying out the invention.

DETAILED DESCRIPTION OF THE INVENTION

The present invention comprises methods, devices, and systems configured for improving (i.e., reducing) the settling time of an output signal read from a photo sensor and improving the Power Supply Rejection Ratio (PSRR) of the supply voltage. In one representative embodiment of the present invention, a method of reading out a signal to an output from a pixel in an active pixel sensor (APS) is provided. A detected charge in the pixel is converted to a voltage and drives a source follower transistor. A bias transistor is coupled in series with the source follower transistor and includes an output therebetween. The bias transistor is driven to source a reduced current when the voltage results from a readout of a reset value of the pixel and the bias transistor is driven to source an enhanced current when the voltage results from a readout of a sensed signal value.

In another representative embodiment of the present invention, a readout circuit for an active pixel sensor (APS) circuit is provided and includes a bias transistor configured for coupling in a source follower configuration with an output transistor of a pixel. The bias transistor and the output transistor includes an output therebetween and the output transistor is responsive to a voltage generated by a photo sensor of the pixel. The readout circuit further includes a minimum current selector coupled to a gate of the bias transistor and configured to drive the bias transistor to source a reduced current when the voltage results from a readout of a reset value. The readout circuit is further configured to drive the bias transistor to source an enhanced current when the voltage results from a readout of a sensed signal value of one of the plurality of pixels.

In yet another representative embodiment of the present invention, an active pixel sensor (APS) circuit is provided and includes a plurality of pixels in at least one column of an array with each of the plurality of pixels including a photo sensor, an output transistor and a row select transistor. The output transistor is responsive to a voltage generated by the photo sensor. The active pixel sensor (APS) circuit further includes a readout circuit connected to the at least one column of the plurality of pixels with the readout circuit including a bias transistor and a minimum current selector. The bias transistor is connected in a source follower arrangement with the output transistor and the row select transistor and the bias transistor is coupled in series with the output transistor and includes the output therebetween. The minimum current selector is coupled to drive the bias transistor and is configured to drive the bias transistor to source a reduced current when the voltage results from a readout of a reset value and is further configured to drive the bias transistor to source an enhanced current when the voltage results from a readout of a sensed signal value of one of the plurality of pixels.

In yet a further representative embodiment of the present invention, an imaging device is provided and includes an active pixel sensor (APS) circuit, a row decoder and a column decoder. The active pixel sensor (APS) circuit includes a plurality of pixels arranged in a plurality of rows and a plurality of columns and further includes a readout circuit connected to each of the plurality of columns. The readout circuit is configured to generate an output signal representative of a signal stored in one of the plurality of pixels. The output signal is driven to source a reduced current when a reset value is read from one of the plurality of pixels and the output signal is driven to source an enhanced current when a sensed signal value is read from the one of the plurality of pixels. The row decoder is operably coupled to the active pixel sensor (APS) circuit and configured for selecting each row of the plurality of rows. The column decoder is operably coupled to the active pixel sensor (APS) circuit and configured for receiving in parallel, at least one signal from each pixel of a selected row.

In a further representative embodiment of the present invention, an electronic system is provided and includes a processor-based device and an imaging device coupled to the processor-based device. The imaging device is configured to read out a signal to an output from a pixel in an active pixel sensor (APS) circuit and the imaging device includes a source follower circuit comprised of a source follower transistor and a bias transistor. A detected charge in the pixel drives the source follower transistor and the bias transistor is either driven to source a reduced current when the voltage results from a readout of a reset value of the pixel or driven to source an enhanced current when the voltage results from a readout of a sensed signal value. The bias transistor and the source follower transistor include the output therebetween.

The following provides a more detailed description of the present invention and various representative embodiments thereof. In this description, circuits and functions may be shown in block diagram form in order to not obscure the present invention in unnecessary detail. Conversely, specific circuit implementations shown and described are exemplary only and should not be construed as limiting or as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a grouping or bus of signals, wherein the bus may have a variety of bit widths and the present invention may be implemented on any number of data signals including a single data signal.

Figure 1:
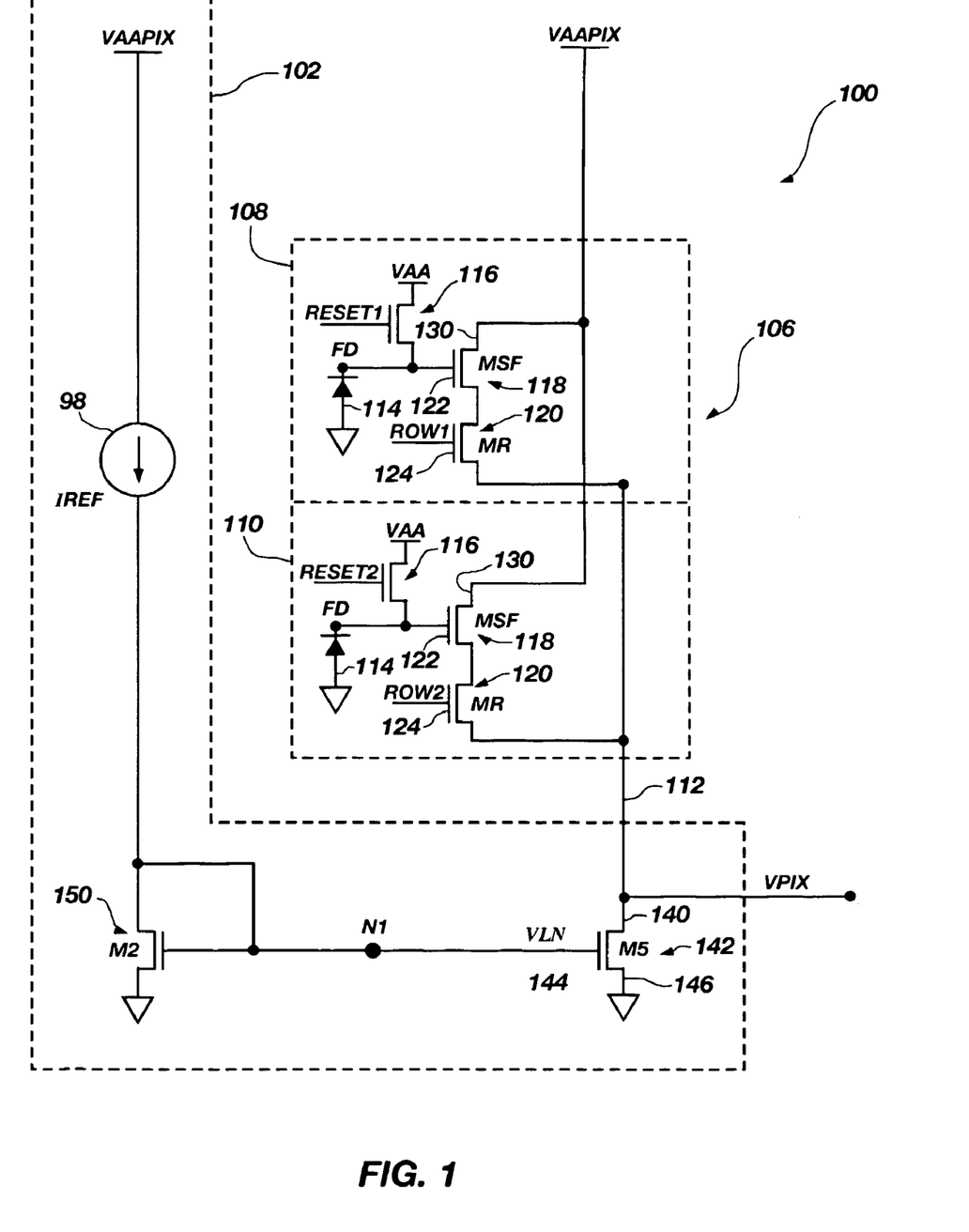
FIG. 1 is a circuit diagram of a portion of an active pixel sensor array including readout circuitry for an active pixel sensor array.

FIG. 1 illustrates a circuit diagram of a portion of an active pixel sensor (APS) circuit including readout circuitry and a simplified portion of an array of pixels. The APS circuit 100 includes an array 106 of independently addressable pixels arranged in n rows and m columns. FIG. 1 illustrates two of the pixels 108, 110 that are connected to a column line 112 of the pixel array. By way of example and not limitation, pixel 108 is in ROW1 and pixel 110 is in ROW2. Each pixel includes a photo detector 114 (e.g., a photo gate, photo diode or pinned photo diode), a reset transistor 116, a source-follower output transistor MSF 118, and a row select transistor MR 120. The gate 122 of the output transistor MSF 118 is connected to a pixel voltage at node FD provided by the photo detector 114. The gate 124 of the row select transistor MR 120 is connected to a row enable voltage which is set HIGH when the pixel is being read out, thereby allowing the voltage on the output transistor MSF 118 to be passed to the column line 112. The output transistor MSF 118 and row select transistor MR 120 may be n-type MOSFET transistors.

The drain 130 of each output transistor MSF 118 in the column is connected to a source supply voltage VAAPIX. The source of each row select transistor MR 120 in the column is connected to the drain 140 of an n-type bias transistor M5 142, which has a gate 144 connected to a bias voltage, VLN, and a source 146 connected to ground. The bias voltage, VLN, is generated by a bias voltage generator including transistor M2 150 coupled in a current mirror arrangement with bias transistor M5 142. A current reference generator 98 generates a reference current IREF.

Configuring the readout circuit 102 in a source follower arrangement bases the output signal VPIX settling time solely upon the drain current of bias transistor M5 142. Such a restriction may become limiting as device speeds increase. Specifically, slow output signal settling occurs when the output signal, VPIX, transitions from a high voltage signal level to a lower voltage signal level. The output signal settling is determined by the drain current of bias transistor M5 142 since the IDS of M5=IREF, which is constant during readout. Faster settling can be achieved by increasing IREF, but results in a reduction of the maximum achievable voltage range of the output signal VPIX, unless transistor MSF 118 is made larger. Generally, transistor MSF 118 cannot efficiently be enlarged as transistor MSF 118 resides in the pixel. Furthermore, an increase in the current through bias transistor M5 142 also results in a slow down in the settling from a low signal level to a high signal level of the output signal VPIX.

Additionally, a source follower configuration of the readout circuit 102 results in a reduction in the Power Supply Rejection Ratio (PSRR). As used herein, PSRR refers to the ratio of a circuit's change at its output relative to the disturbance at the power supply that caused the disturbance, or put another way, the PSRR measures the ability of an amplifier to maintain its output voltage as its power-supply voltage is varied. In the readout circuit 102 of FIG. 1, $PSRR=A_{v\_FD}/A_{v\_VAAPIX} \approx g_{m\_MSF}/g_{ds\_MSF}$ for low frequencies, and $PSRR \approx (C_{FD}+C_{FD\_VAAPIX})/C_{FD\_VAAPIX}$ for high frequencies, where,
$A_{v\_FD}=VPIX/V_{FD}$,
$A_{v\_VAAPIX}=VPIX/VAAPIX$,
$g_{m\_MSF}$ is the transconductance of transistor MSF,
$g_{ds\_MSF}$ is the conductance of transistor MSF,
$C_{FD}$ is the capacitance from node FD to ground,
$C_{FD\_VAAPIX}$ is the capacitance from node FD to VAAPIX.

Figure 2:
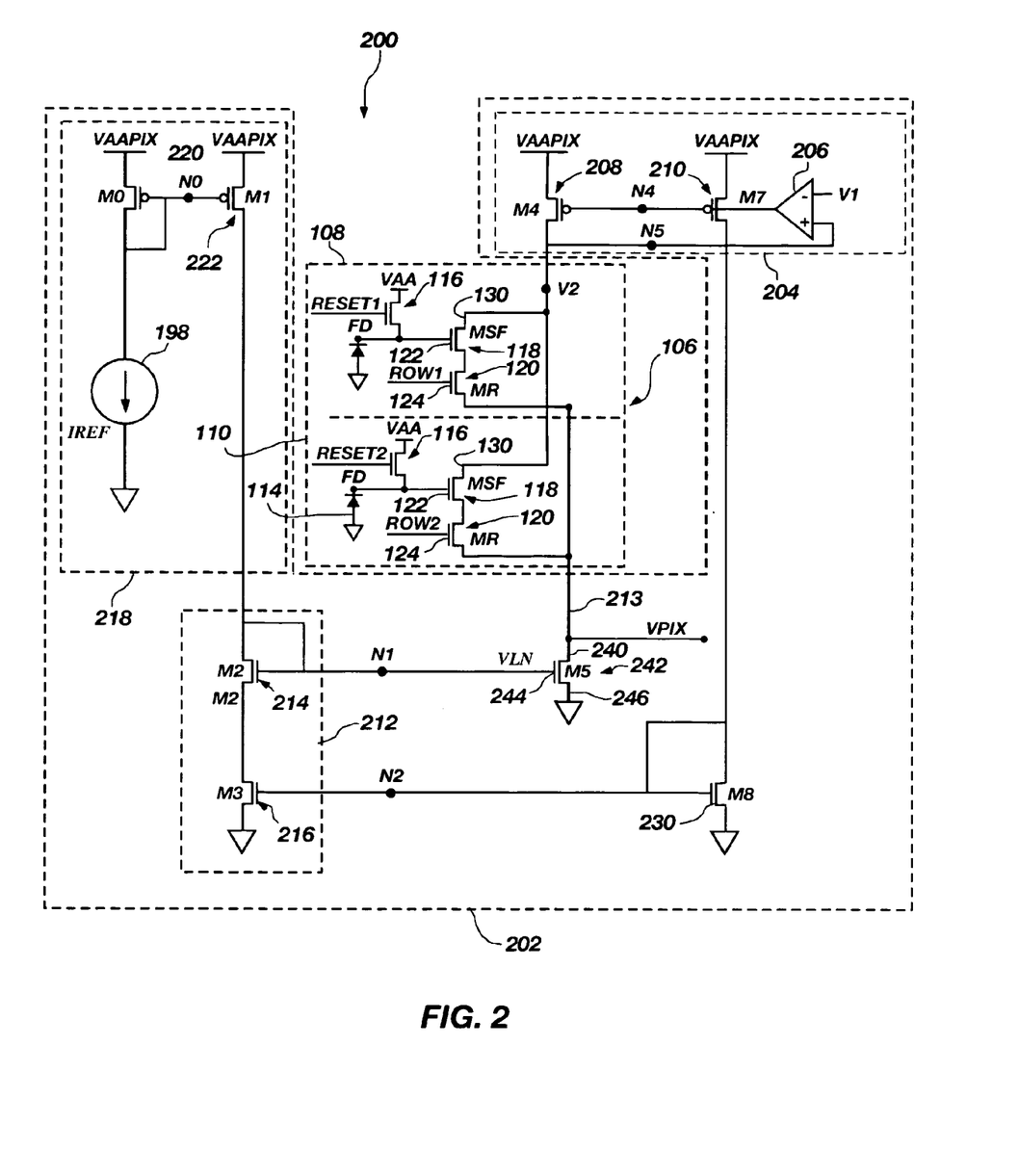
FIG. 2 is a circuit diagram of a portion of an active pixel sensor array including readout circuitry, in accordance with a representative embodiment of the invention.

FIG. 2 illustrates a circuit diagram of a portion of an active pixel sensor (APS) circuit including readout circuitry and a portion of an array of pixels, in accordance with an embodiment of the present invention. The readout circuit 202 of an active pixel sensor (APS) circuit 200 includes an array 106 of pixels, a voltage regulator 204, a bias transistor M5 242, and a minimum current selector circuit 212 including transistor M2 214 and transistor M3 216. The readout circuit 202 further couples to a reference generator 218 including a transistor M0 220 and transistor M1 222 coupled at node N0 in a current mirror configuration. Reference generator 218 further includes a current reference generator 198 for generating a reference current IREF.

The voltage regulator 204 is configured, by way of example and not limitation, to include an amplifier 206 configured to drive the gates of transistor M4 208 and transistor M7 210. Amplifier 206 couples at node N4 to the respective gates of transistors M4 208 and transistor M7 210 and the operation of voltage regulator 204 regulates node N5 to a voltage V1.

The active pixel sensor (APS) circuit 200 further includes an array 106 of independently addressable pixels arranged in n rows and m columns. FIG. 2 illustrates two of the pixels 108, 110 that are connected to a column line 213 of the pixel array. By way of example and not limitation, pixel 108 is in ROW1 and pixel 110 is in ROW2. Each pixel includes a photo detector 114, a reset transistor 116, a source-follower output transistor MSF 118, and a row select transistor MR 120. The gate 122 of the output transistor MSF 118 is connected to a pixel voltage at node FD provided by the photo detector 114. The gate 124 of the row select transistor MR 120 is connected to a row enable voltage which is set HIGH when the pixel is being read out, thereby allowing the voltage on the output transistor MSF 118 to be passed to the column line 112. The output transistor MSF 118 and row select transistor MR 120 may be n-type MOSFET transistors.

The drain 130 of each output transistor MSF 118 in the column is connected to a source supply voltage at node N5 as regulated from VAAPIX by voltage regulator 204. The source of each row select transistor MR 120 in the column is connected to the drain 240 of an n-type bias transistor M5 242, which has a gate 244 connected at a node N1 to a bias voltage, VLN, and a source 246 connected to ground. The bias voltage, VLN, is generated by a minimum current selector circuit 212 including transistor M2 214, coupled in a current mirror arrangement with transistor M5 242, and transistor M3 216. Minimum current selector circuit 212 controls the class AB operation of bias transistor M5 242.

In operation, readout circuit 202 improves both the PSRR and shortens the settling time of VPIX. Specifically, voltage regulator 204 improves the PSRR of the active pixel sensor (APS) circuit 200 for both low and high frequency operations by regulating VAAPIX. Improvements to the PSRR are on the order of the amplitude gain, A, of amplifier 206. The other circuit elements of readout circuit 202 facilitate the shortening of the settling time of VPIX, without reducing the available voltage swing since IREF and the nominal current, $I_{VLN}$, through transistor M5 242 can be much smaller.

During an initial readout of the signal value at node FD from the photo detector 114, the transistor MSF 118 is "turned off" with nominal or reduced current $I_{D4}$ and $I_{D7}$ flowing through transistor M4 208 and transistor M7 210. The current is mirrored to minimum current selector circuit 212 which causes the voltage at node N2 to decrease and cause $I_{D7}$ to flow through the current selector circuit 212. The current flowing through current selector circuit 212 is much less than IREF and the voltage at node N1 increases to the maximum output voltage that transistor M1 222 can supply. This results in the current, $I_{M5}$ or $I_{VLN}$, through transistor M5 242 being significantly boosted during readout.

During readout of the reset value, the transistor M4 208 and transistor M7 210 supply relatively large currents. The current, $I_{D7}$, is mirrored to the minimum current selector circuit 212 and causes transistor M2 214 to see approximately the same $V_{GS}$ as transistor M5 242. Thus, the current through transistor M5, $I_{M5}$ or $I_{VLN}$, is reduced to the mirrored value of IREF. In a quiescent state, the $I_{M5}$ or $I_{VLN}$ is given by the combined transistor sizes of the minimum current selector circuit 212 when transistor M2 214 and transistor M3 216 are biased into saturation. Reduction in the current through bias transistor M5 242 improves the settling time for VPIX for a positive change in potential at node FD over the readout circuit 102 of FIG. 1.

Figure 3:
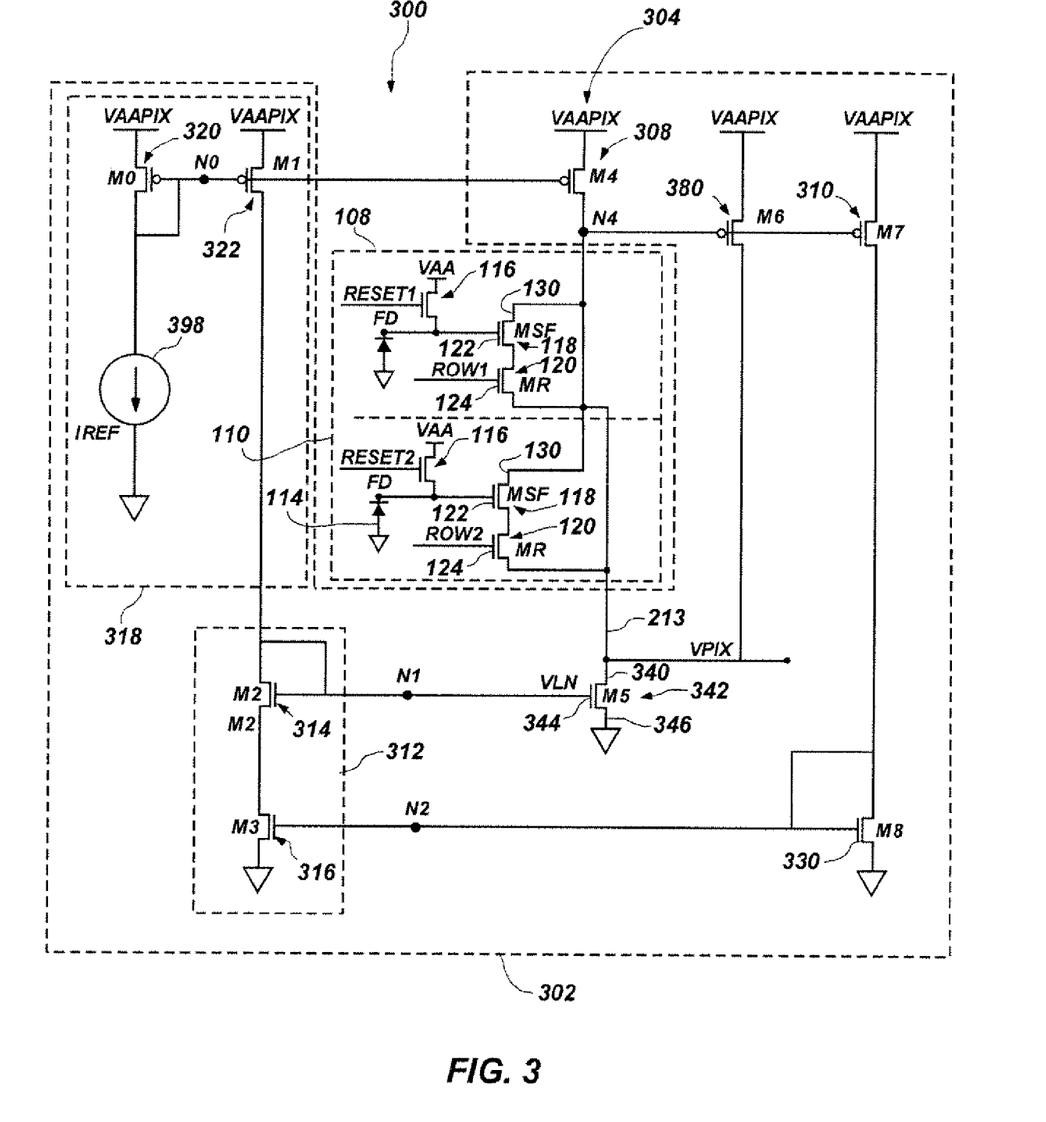
FIG. 3 is a circuit diagram of a portion of an active pixel sensor array including readout circuitry, in accordance with another representative embodiment of the invention.

FIG. 3 illustrates a circuit diagram of a portion of an active pixel sensor (APS) circuit including readout circuitry and an array of pixels, in accordance with another embodiment of the present invention. The readout circuit 302 of an active pixel sensor (APS) circuit 300 includes an array 106 of pixels, an extended source follower 304, a bias transistor M5 342, and a minimum current selector circuit 312, including transistor M2 314 and transistor M3 316. The extended source follower 304 includes a transistor M4 308, transistor M5 342, pull-up transistor M6 380, and utilizes transistor MSF 318 to complete the source follower interconnect.

Readout circuit 302 further includes transistor M7 310 and transistor M8 330 configured in a current mirror relationship with minimum current selector circuit 312. The readout circuit 302 further includes a transistor M0 320 and transistor M1 322 coupled at node N0 in a current mirror configuration. A current reference 398 generates a reference current IREF.

The active pixel sensor (APS) circuit 300 further includes an array 106 of independently addressable pixels arranged in n rows and m columns. FIG. 3 illustrates two of the pixels 108, 110 that are connected to a column line 313 of the pixel array. By way of example and not limitation, pixel 108 is in ROW1 and pixel 110 is in ROW2. Each pixel includes a photo detector 114, a reset transistor 116, a source-follower output transistor MSF 118, and a row select transistor MR 120. The gate 122 of the output transistor is connected to a pixel voltage provided by the photo detector. The gate 124 of the row select transistor MR 120 is connected to a row enable voltage which is set HIGH when the pixel is being read out, thereby allowing the voltage on the output transistor to be passed to the column line 313. The output transistor MSF 118 and row select transistor MR 120 may be n-type MOSFET transistors.

The drain 130 of each output transistor MSF 118 in the column is connected to a pull-up transistor M4 308 at node N4. The source of each row select transistor MR 120 in the column is connected to the drain 340 of an n-type source follower transistor 342, which has a gate 344 connected at a node N1 to a bias voltage, VLN, and a source 346 connected to ground. The bias voltage, VLN, is generated by a minimum current selector circuit 312 including transistor M2 314, coupled in a current mirror arrangement with transistor 342, and transistor M3 316. Minimum current selector circuit 312 controls the class AB operation of bias transistor M5 342.

In operation, transistor M4 308 sources a constant current through the pixel source follower transistor MSF 118 as well as through the select transistor MR 120. The extra current to charge or discharge the capacitive load at VPIX is provided by either pull-up transistor M6 380 or transistor M5 342. It is noted that negative feedback from the output VPIX to node N4 exists via the pixel source follower transistor MSF 118 and the select transistor MR 120. The gain from the gate 122 of transistor MSF 118 to VPIX may be similar to the embodiment of FIG. 1 if $g_{m\_M6}/g_{ds\_M6} \gg 1$. Also, the PSRR of the present embodiment may be approximated to be PSRR $g_{m\_MSF}/g_{ds\_MSF}$ which is similar to the embodiment of FIG. 1, however, since IREF is much smaller for a given settling time and $g_{m\_MSF}/g_{ds\_MSF}$ is approximately equal to the order of $I^{-1/2}$, the PSRR is improved in the present embodiment. The range of the maximum output of VPIX is also similarly improved.

Furthermore, during the readout of the signal value, the pull-up transistor M6 380 is "turned off" allowing only nominal current to flow through the pull-up transistor M6 380 and transistor M7 310. This nominal current is mirrored to the minimum current selector circuit 312 which causes the voltage at node N2 to decrease resulting in the current through transistor M7 to flow through the current selector circuit 312. Since the current through the minimum current selector circuit 312 is much smaller than IREF, the voltage at node N1 increases to the maximum output voltage that transistor M1 322 can supply. Therefore, the current through transistor M5 342 is significantly boosted during readout of the signal value.

During readout of the reset value, the pull-up transistor M6 380 supplies a large current which is mirrored to the minimum current selector circuit 312 and causes transistor M2 314 to have approximately the same $V_{GS}$ as bias transistor M5 342. Thus, the current, $I_{VLN}$, through bias transistor M5 342 is reduced to the mirrored value of IREF. As a note during a quiescent state, $I_{VLN}$ is given by the combined transistor sizes of the minimum current selector circuit 312 when all transistors are biased in the saturation mode. In the present embodiment, the output impedance is also reduced in comparison to the embodiment of FIG. 1 resulting in an improvement to the settling time for low-to-high transitions node FD.

Figure 4:
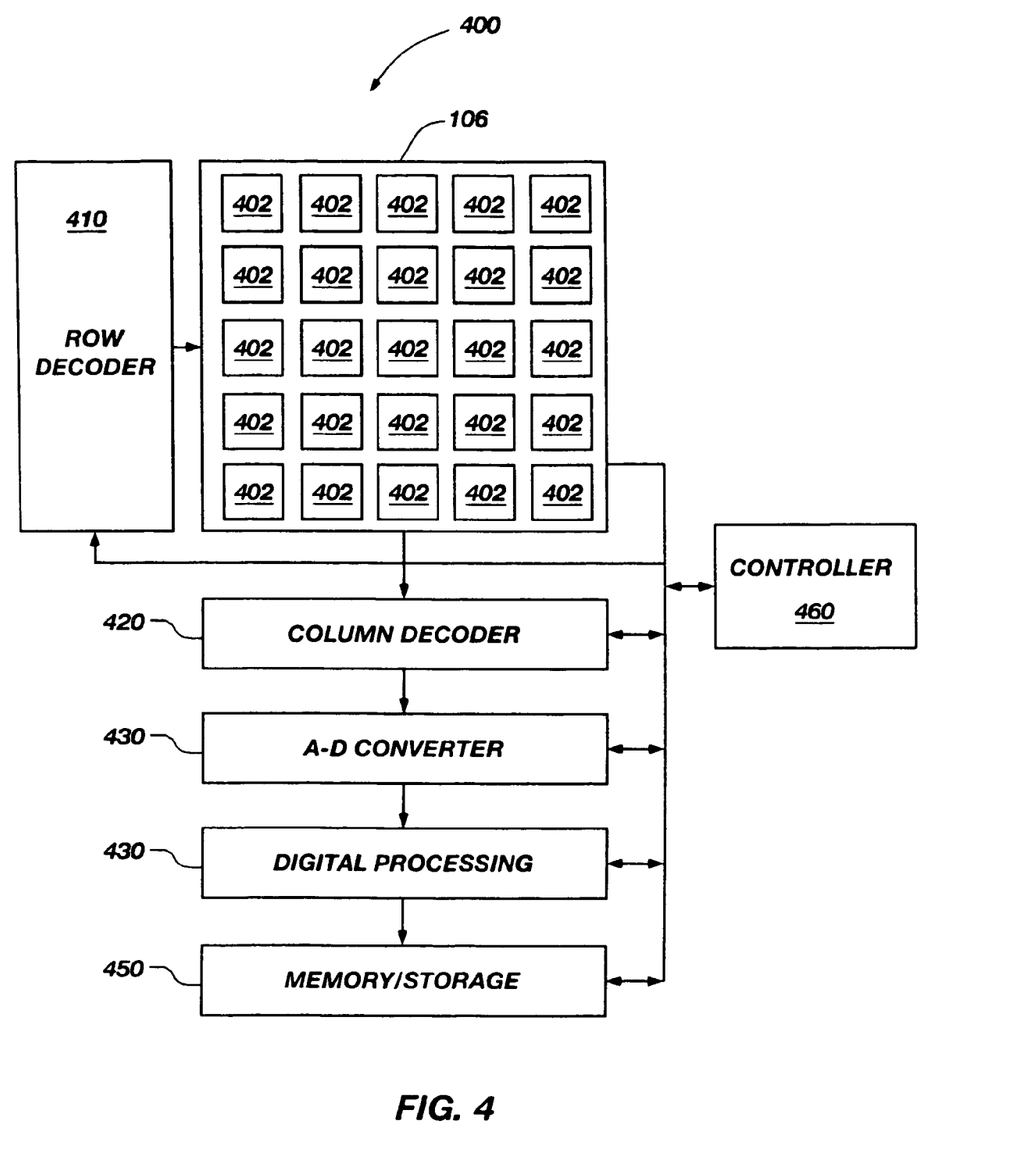
FIG. 4 is a block diagram of an imaging device including an active pixel sensor array, in accordance with an embodiment of the present invention.

FIG. 4 is a block diagram of an imaging device, in accordance with a representative embodiment of the present invention. Imaging device 400 includes a plurality of pixels 402, forming a pixel array 106. The pixel array 106 includes rows and columns of pixels as described above. The imaging device 400 also includes row decoder 410, column decoder 420, an analog-to-digital converter 430, a digital processing circuit 440, and a memory or storage device 450. The imaging device 400 also includes a controller 460. The row decoder 410 selects a row of pixels 402 from the pixel array 106. The pixels 402 in the selected row output their reset and pixel signals RESET, ROWX to the column decoder 420, which samples and holds the reset and pixel signals RESET, ROWX. The column decoder 420 also forms the pixel output signal VPIX, which is presented to the analog-to-digital converter 430 that converts the difference signal to a digital value. The digital value is then processed by the digital processing circuit 440, which stores the processed value in the storage device 450 for output. The controller 460 is coupled to the pixel array 106, row decoder 410, column decoder 420, digital processing circuit 440, and storage device 450, and provides control signals to perform the above described processing.

Figure 5:
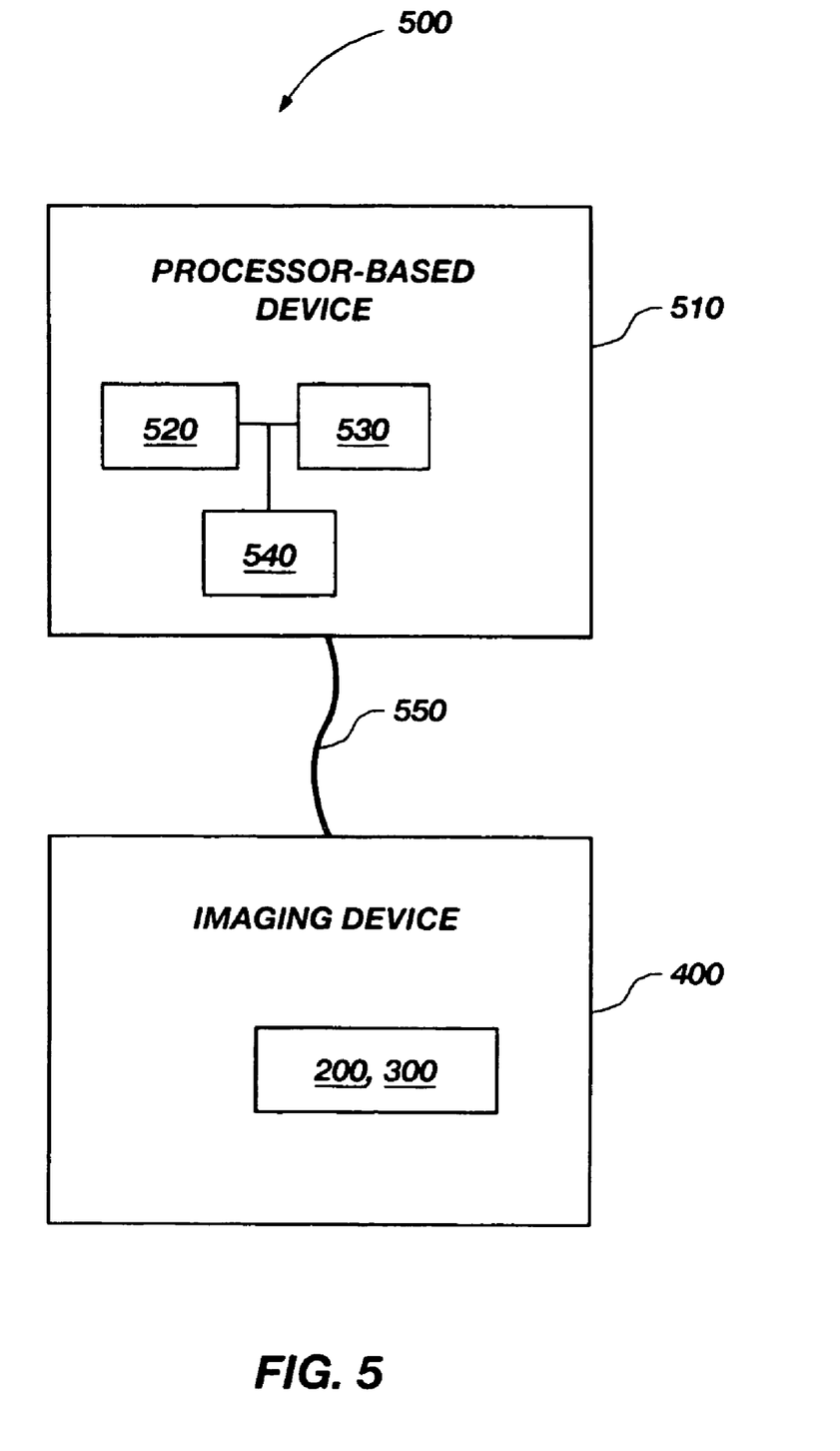
FIG. 5 is a block diagram of an electronic system including an imaging device, in accordance with an embodiment of the present invention.

FIG. 5 illustrates an electronic system, in accordance with a representative embodiment of the present invention. Electronic system 500 includes a processor-based device 510 that may be, for example, a digital camera, a personal computer, or other image processing apparatus, and includes, for example, a controller 520, a memory 530, and an I/O controller 540. The memory 530 may be a conventional memory. Alternatively, the memory 530 may be, or may include, a removable memory, such as a removable flash memory device. The I/O controller 540 is coupled to interconnect 550, which couples the processor-based device 510 to an imaging device 400. The imaging device 400 incorporates an active pixel sensor (APS) circuit, such as active pixel sensor (APS) circuit 200 of FIG. 2 or active pixel sensor (APS) circuit 300 of FIG. 3, as described hereinabove with reference to the representative embodiments of the present invention.

The present invention therefore presents a number of embodiments for a readout circuit that provides an improved settling time for the output signal for use in an active pixel sensor (APS) circuit and imaging system. While the invention has been described in detail in connection with the representative embodiments, it should be understood that the invention is not limited to the above disclosed embodiments. Rather, the invention may be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed is:

1. A method of reading out a signal to an output from a pixel in an active pixel sensor (APS), comprising:
converting a detected charge in the pixel into a voltage;
driving a source follower transistor in response to the voltage;
driving a bias transistor to source a first current when the voltage results from a readout of a reset value of the pixel; and
driving the bias transistor to source a second current when the voltage results from a readout of a sensed signal value, the bias transistor coupled in series with the source follower transistor and having the output therebetween, wherein the second current is larger than the first current.

2. The method of claim 1, further comprising:
generating a reference current;
enhancing sourcing of the bias transistor in response to the reference current when the voltage results from the readout of a reset value; and
reducing sourcing of the bias transistor to source the reference current when the voltage results from the readout of a sensed signal value.

3. The method of claim 2, further comprising current mirroring the first current to determine whether to drive the bias transistor with the first current or the second current.

4. The method of claim 1, further comprising current mirroring the reference signal with the bias transistor.

5. The method of claim 1, further comprising individually regulating a supply voltage to source to the source follower transistor in each pixel in a column of pixels.

6. The method of claim 1, further comprising additionally pulling up the output when the voltage results from the readout of a reset value.

7. A readout circuit for an active pixel sensor (APS) circuit, comprising:
a bias transistor configured for coupling in a source follower configuration with an output transistor of a pixel and having an output therebetween, the output transistor responsive to a voltage generated by a photo sensor of the pixel; and
a minimum current selector coupled to a gate of the bias transistor and configured to drive the bias transistor to source a first current when the voltage results from a readout of a reset value and further configured to drive the bias transistor to source a second current when the voltage results from a readout of a sensed signal value of one of the plurality of pixels, wherein the second current is larger than the first current.

8. The readout circuit of claim 7, further comprising a reference generator coupled to the minimum current selector and configured to generate a reference current supplied to the minimum current selector to either increase sourcing of the bias transistor in response to the reference current when the voltage results from the readout of a reset value or to reduce sourcing of the bias transistor to source the reference current when the voltage results from the readout of a sensed signal value.

9. The readout circuit of claim 7, further comprising a first current mirror configured to mirror the first current to determine whether to drive the bias transistor with the first current or the second current.

10. The readout circuit of claim 9, further comprising a second current mirror coupling the reference current with the bias transistor.

11. The readout circuit of claim 7, further comprising a voltage regulator coupled to a drain of an output transistor and configured to individually regulate a supply voltage to source to the output transistor of each pixel in a column of pixels.

12. The readout circuit of claim 7, further comprising a pull-up transistor coupled to the output and configured to pull-up the output when the voltage results from the readout of a reset value.

13. An active pixel sensor (APS) circuit, comprising:
a plurality of pixels in at least one column of an array, each of the plurality of pixels including a photo sensor, an output transistor and a row select transistor, the output transistor responsive to a voltage generated by the photo sensor; and
a readout circuit connected to at least one column of the plurality of pixels, the readout circuit including:
a bias transistor connected in a source follower arrangement with the output transistor and the row select transistor, the bias transistor coupled in series with the output transistor and having the output therebetween; and
a minimum current selector coupled to drive the bias transistor, the minimum current selector configured to drive the bias transistor to source a first current when the voltage results from a readout of a reset value and further configured to drive the bias transistor to source a second current when the voltage results from a readout of a sensed signal value of one of the plurality of pixels, wherein the second current is larger than the first current.

14. The active pixel sensor (APS) circuit of claim 13, further comprising a reference generator configured to generate a reference current used to determine whether to increase sourcing of the bias transistor in response to the reference current when the voltage results from the readout of a reset value or to reduce sourcing of the bias transistor at a level of the reference current when the voltage results from the readout of a sensed signal value.

15. The active pixel sensor (APS) circuit of claim 14, further comprising a first current mirror configured to mirror the first current to determine whether to drive the bias transistor with the first current or the second current.

16. The active pixel sensor (APS) circuit of claim 15, further comprising a second current mirror configured to mirror current of the reference signal with the bias transistor.

17. The active pixel sensor (APS) circuit of claim 13, further comprising a voltage regulator configured to individually regulate a supply voltage to source to the output transistor in each column of pixels in the active pixel sensor (APS) circuit.

18. The active pixel sensor (APS) circuit of claim 13, further comprising a pull-up transistor configured to pull-up the output when the voltage results from the readout of a reset value.

19. An imaging device, comprising:
an active pixel sensor (APS) circuit including a plurality of pixels arranged in a plurality of rows and a plurality of columns, the active pixel sensor (APS) circuit including a readout circuit connected to each of the plurality of columns of the plurality of pixels and further configured to generate an output signal representative of a signal stored in one of the plurality of pixels wherein the readout circuit is driven to source the output signal from a first current when a reset value is read from one of the plurality of pixels and the readout circuit is driven to source the output signal from a second current when a sensed signal value is read from one of the plurality of pixels and wherein the second current is larger than the first current;
a row decoder operably coupled to the active pixel sensor (APS) circuit and configured for selecting each row of the plurality of rows; and
a column decoder operably coupled to the active pixel sensor (APS) circuit and configured for receiving in parallel, at least one signal from each pixel of a selected row.

20. The imaging device of claim 19, wherein each of the plurality of pixels includes a photo sensor, an output transistor and a row select transistor, the output transistor responsive to a voltage generated by the photo sensor, and
the readout circuit includes a bias transistor connected in a source follower arrangement with the output transistor and the row select transistor, the bias transistor coupled in series with the output transistor and having an output therebetween for generating the output signal thereon.

21. The imaging device of claim 20, further comprising a minimum current selector coupled to drive the bias transistor, the minimum current selector configured to drive the bias transistor to source the first current when the voltage results from a readout of the reset value and further configured to drive the bias transistor to source the second current when the voltage results from a readout of the sensed signal value of one of the plurality of pixels.

22. The imaging device of claim 21, further comprising a reference generator coupled to the minimum current selector and configured to generate a reference current supplied to the minimum current selector to either increase sourcing of the bias transistor in response to the reference current when the voltage results from the readout of a reset value or to reduce sourcing of the bias transistor to source the reference current when the voltage results from the readout of a sensed signal value.

23. The imaging device of claim 21, further comprising a voltage regulator configured to couple to a drain of an output transistor to individually regulate a supply voltage to source to the output transistor to each pixel in a column of pixels.

24. The imaging device of claim 21, further comprising a pull-up transistor coupled to the output and configured to pull-up the output when the voltage results from the readout of a reset value.

25. The imaging device of claim 19, further comprising an analog-to-digital converter coupled to the active pixel sensor (APS) circuit and configured to convert the output signal into a digital value.

26. The imaging device of claim 25, further comprising a memory configured for storing the digital value representative of the sensed signal value.

27. An electronic system, comprising:
a processor-based device; and
an imaging device coupled to the processor-based device, the imaging device configured to read out a signal to an output from a pixel in an active pixel sensor (APS) circuit, the imaging device including a source follower circuit comprised of a source follower transistor and a bias transistor wherein a detected charge in the pixel drives the source follower transistor and the bias transistor is either driven to source a first current when the voltage results from a readout of a reset value of the pixel or driven to source a second current when the voltage results from a readout of a sensed signal value, the bias transistor and the source follower transistor include the output therebetween, wherein the second current is larger than the first current.

28. The electronic system of claim 27, further comprising a reference generator configured to generate a reference current for enhancing and reducing sourcing of the bias transistor in response to the voltage.

29. The electronic system of claim 27, further comprising a voltage regulator configured to individually regulate a supply voltage to source to the source follower transistor in each column of pixels in the active pixel sensor (APS) circuit.

30. The electronic system of claim 27, further comprising a pull-up transistor coupled to the output and configured to pull-up the output when the voltage results from the readout of a reset value.

* * * * *